United States Patent
Ding et al.

(10) Patent No.: US 11,528,176 B2
(45) Date of Patent: Dec. 13, 2022

(54) APPARATUS AND METHOD FOR SYMBOL TIME RECOVERY USING FEEDBACK LOOP

(71) Applicant: Samsung Electronics Co., Ltd., Gyeonggi-do (KR)

(72) Inventors: Yacong Ding, San Diego, CA (US); Hyukjoon Kwon, San Diego, CA (US)

(73) Assignee: Samsung Electronics Co., Ltd

( * ) Notice: Subject to any disclaimer, the term of this patent is extended or adjusted under 35 U.S.C. 154(b) by 120 days.

(21) Appl. No.: 16/742,251

(22) Filed: Jan. 14, 2020

(65) Prior Publication Data

US 2021/0083919 A1 Mar. 18, 2021

Related U.S. Application Data (60) Provisional application No. 62/900,024, filed on Sep. 13, 2019.

(51) Int. Cl.
| | |
|---|---|
| *H04L 12/26* | (2006.01) |
| *H04L 27/26* | (2006.01) |
| *H04L 25/02* | (2006.01) |
| *H04B 1/7113* | (2011.01) |

(52) U.S. Cl.
CPC ........ *H04L 27/2665* (2013.01); *H04B 1/7113* (2013.01); *H04L 25/0202* (2013.01); *H04L 27/2675* (2013.01)

(58) Field of Classification Search
CPC ..... H04W 24/08; H04W 24/10; H04W 88/08; H04W 24/02; H04L 5/0048
See application file for complete search history.

(56) References Cited

U.S. PATENT DOCUMENTS

| | | | | |
|---|---|---|---|---|
| 8,175,123 | B2* | 5/2012 | Vrcelj | H04L 25/0216 370/510 |
| 10,505,653 | B1* | 12/2019 | Berger | G04R 20/30 |
| 2003/0054832 | A1* | 3/2003 | Stein | G01S 5/0221 455/456.1 |
| 2003/0086371 | A1 | 5/2003 | Walton et al. | |

(Continued)

FOREIGN PATENT DOCUMENTS

KR 10-0617091 8/2006

*Primary Examiner* — Atique Ahmed
(74) *Attorney, Agent, or Firm* — The Farrell Law Firm, P.C.

(57) ABSTRACT

Methods and an apparatus are provided. A first method includes receiving an estimated first arrival path (FAP); processing the estimated FAP; providing a rounding operation on the processed estimated FAP to generate an adjustment value for adjusting a fast Fourier transform (FFT) window; determining a quantization error based on the processed estimated FAP; and summing the quantization error to the processed estimated FAR A second method includes receiving an estimated FAP; determining a weighted average of the estimated FAP; processing the weighted average of the estimated FAP; providing a rounding operation on the processed weighted average of the estimated FAP to generate an adjustment value for adjusting an FFT window; determining a delayed STR adjustment based on the processed weighted average of the estimated FAP in a previous time slot; and summing the delayed STR adjustment to the processed weighted average of the estimated FAP in a current time slot.

12 Claims, 10 Drawing Sheets

(56) References Cited

U.S. PATENT DOCUMENTS

| | | |
|---|---|---|
| 2003/0194024 A1 | 10/2003 | Edde |
| 2004/0125003 A1* | 7/2004 | Craven ............... H03M 7/3046 |
| | | 341/76 |
| 2005/0124368 A1 | 6/2005 | Diao et al. |
| 2007/0030838 A1* | 2/2007 | Kaikkonen ........... H04W 52/44 |
| | | 370/342 |
| 2007/0072621 A1* | 3/2007 | Mukkavilli ........... G01S 5/0226 |
| | | 455/456.1 |
| 2007/0110174 A1* | 5/2007 | Glazko ............... H04L 27/2665 |
| | | 375/260 |
| 2007/0217525 A1* | 9/2007 | Vrcelj ................ H04L 27/2657 |
| | | 375/343 |
| 2007/0229355 A1* | 10/2007 | Han ..................... G01S 5/0221 |
| | | 342/419 |
| 2008/0012768 A1 | 1/2008 | Eberlein |
| 2011/0282625 A1* | 11/2011 | Craninckx ........... G04F 10/005 |
| | | 702/178 |
| 2013/0235911 A1 | 9/2013 | Geirhofer et al. |
| 2014/0064350 A1* | 3/2014 | Krauss ................ H04B 7/0857 |
| | | 375/232 |
| 2016/0127871 A1* | 5/2016 | Smith .................. H04W 4/029 |
| | | 455/456.6 |
| 2020/0319329 A1* | 10/2020 | Shahar-Doron .... H04L 25/0256 |
| 2021/0041549 A1* | 2/2021 | Kerner .................... G01S 13/50 |

* cited by examiner

APPARATUS AND METHOD FOR SYMBOL TIME RECOVERY USING FEEDBACK LOOP

PRIORITY

This application is based on and claims priority under 35 U.S.C. § 119(e) to a U.S. Provisional Patent Application filed on Sep. 13, 2019 in the United States Patent and Trademark Office and assigned Ser. No. 62/900,024, the entire contents of which are incorporated herein by reference.

FIELD

The present disclosure relates generally to a wireless communication system and, more particularly, to an apparatus and method for symbol time recovery (STR) using a feedback loop.

BACKGROUND

In a wireless communication system (e.g., a $5^{th}$ generation (5G) communication receiver), a receiver may determine a symbol timing to demodulate symbols transmitted from a transmitter. An STR processor may be used to adjust a fast Fourier transform (FFT) timing window according to a time offset. A method of estimating a time offset (e.g., an STR method) may be based on first arrival path (FAP) estimation. An FAP indicates a time instance of a first path, which is at time 0 if there is no time offset. If there is a time offset, an FAP may be shifted accordingly. Based on an estimated FAP, an FFT timing window may be adjusted to a desired range to compensate for a time offset.

In a method using an STR processor, an FAP, as well as other timing-related parameters such as last arrival path (LAP) and center of mass (CoM), may be obtained by performing a moving sum operation on a channel power delay profile (PDP) (e.g., sliding a window of length W across a PDP and cumulatively summing the values of the windows), which may be obtained from a channel estimation (CE) processor. Different types of reference signals, e.g., tracking reference signal (TRS), a channel state information reference signal (CSI-RS), a synchronization signal block (SSB), a physical broadcast channel demodulation reference signal/secondary synchronization signal (PBCH DMRS/SSS), and a physical downlink shared channel DMRS (PDSCH DMRS), may be used to generate a PDP depending on specific configurations. A predefined threshold for a moving sum is used to determine an FAP. As a result, a method using an STR processor may be sensitive to a quality of an instantaneously estimated PDP and a choice of a threshold. For a fading channel with a small number of reference signals, a variance of an estimated FAP may be very large, causing incorrect FFT window placement.

Moreover, since a PDP may be obtained from a CE processor, a sampling rate of a PDP may be dependent on a numerology and a pattern of a specific reference signal (RS), which may be different from a sampling rate of an orthogonal frequency division multiplexing (OFDM) system. When a sampling rate of a PDP is much less than a sampling rate of a system, an estimated PDP may not accurately reflect a true time offset due to insufficient resolution.

SUMMARY

According to one embodiment, a method is provided. The method includes receiving an estimated first arrival path (FAP); processing the estimated FAP; providing a rounding operation on the processed estimated FAP to generate an adjustment value for adjusting a fast Fourier transform (FFT) window; determining a quantization error based on the processed estimated FAP; and summing the quantization error to the processed estimated FAP.

According to one embodiment, a method is provided. The method includes receiving an estimated FAP; determining a weighted average of the estimated FAP; processing the weighted average of the estimated FAP; providing a rounding operation on the processed weighted average of the estimated FAP to generate an adjustment value for adjusting an FFT window; determining a delayed STR adjustment based on the processed weighted average of the estimated FAP in a previous time slot; and summing the delayed STR adjustment to the processed weighted average of the estimated FAP in a current time slot.

According to one embodiment, an apparatus is provided. The apparatus includes a moving sum processor configured to estimate an FAP; a processor configured to process the estimated FAP; a rounding processor configured to perform a rounding operation on the processed estimated FAP to generate an adjustment value for adjusting an FFT window; a quantization error compensation processor configured to determine a quantization error based on the processed estimated FAP; and an adder configured to sum the quantization error to the processed estimated FAP.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure.

Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Figure 1:
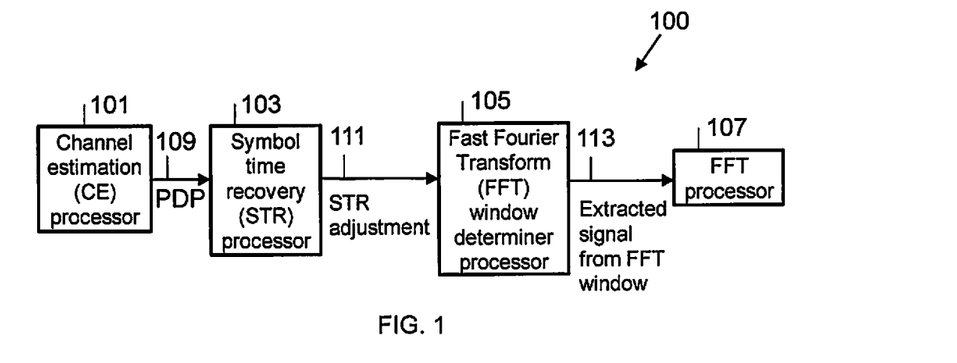
FIG. 1 is a block diagram of an apparatus for determining an FFT timing window using an STR processor, according to an embodiment.

FIG. 1 is a block diagram of an apparatus for determining an FFT timing window using an STR processor, according to an embodiment. An apparatus 100 includes a CE processor 101, the STR processor 103, an FFT window determiner processor 105, and an FFT processor 107. In an embodiment, the CE processor 101, the STR processor 103, the FFT window determiner processor 105, and the FFT processor 107 may be included in one processor, or the functionality of each may be distributed amongst a plurality of processors.

The CE processor 101 includes an output 109 for providing a PDP. The STR processor 103 includes an input connected to the output 109 of the CE processor 101 and an output 111. The output 111 of STR processor 103 is an STR adjustment. The STR processor 103 uses the PDP to determine the STR adjustment based on the FAP. The inputs to the STR processor 103 may include PDP information from the CE processor 101, parameters of circular shift $\Delta_{circ}$ circular shift to the right) and a sliding window length W, which may be used in a moving sum algorithm. To estimate different timing-related parameters such as FAP, LAP, and median, thresholds for estimating each of them may also be provided. Then a circular shift operation is performed which is useful in addressing negative time offset, followed by calculating a moving sum of the PDP with a window length W. Finally, FAP/LAP/median may be calculated using the provided thresholds in the same manner.

The FFT window determiner processor 105 includes an input connected to the output 111 of the STR processor 103 for receiving the STR adjustment and an output 113 for outputting a received signal in the determined FFT window. The FFT window determiner processor 105 places an FFT window on a received signal based on the STR adjustment to extract the portion of the received signal that is in the determined FFT window. The FFT processor 107 includes an input connected to the output 113 of the FFT window determiner processor 105 for receiving the portion of the received signal that is within the determined FFT window. The FFT processor 107 applies FFT processing on the signal received from the FFT window determiner processor 105.

Figure 2:
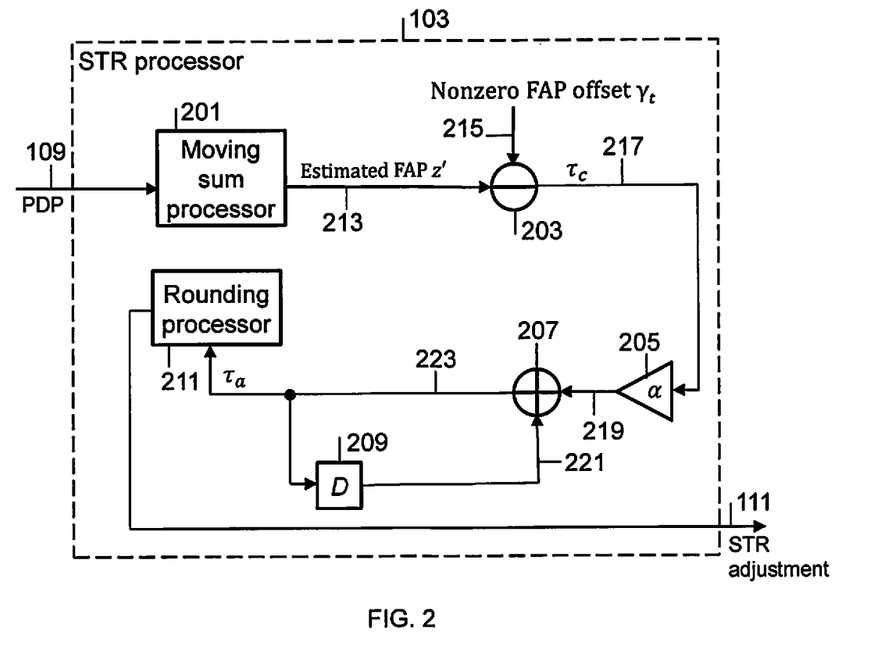
FIG. 2 is a block diagram of an STR processor of FIG. 1, according to an embodiment.

FIG. 2 is a block diagram of the STR processor 103 of FIG. 1, according to an embodiment.

Referring to FIG. 2, the STR processor (or feedback loop processor) 103 includes a moving sum processor 201, a subtractor 203, a gain stage 205 (e.g., an amplifier), an adder 207, a delay stage 209, and a rounding processor 211. In an embodiment, the functionality of the moving sum processor 201 and the rounding processor 211 may be included in one processor, or the functionality of each may be distributed amongst a plurality of processors.

The moving sum processor 201 includes an input connected to the output 109 of the CE processor 101 for receiving the PDP, and an output 213 for providing an estimate of an FAP z'. The subtractor 203 includes a first input connected to the output 213 of the moving sum processor 201 for receiving the estimated FAP z', a second input 215 for receiving a nonzero FAP offset n (e.g., a target FAP offset), and an output 217 for subtracting the nonzero FAP offset $\gamma_t$ from the estimated FAP z' to provide the difference as an intermediate STR adjustment $\tau_c$. The nonzero FAP offset $\gamma_t$ helps to prevent STR adjustment from overshooting the correct timing point and facilitate the shift of the FFT window within a desired region.

The nonzero FAP offset $\gamma_t$ is integrated into the SIR processor 103. The goal of such nonzero FAP offset $\gamma_t$ is to leave room for possible estimation error and prevent the FFT window from being placed behind the correct timing position. For example, Equation (8) below, shows that the effect of $\gamma_t$ in the feedback loop is equivalent to subtracting $\gamma_t$ from an infinite impulse response (IIR) filtered FAP estimation $S_n$, and the STR adjustment, $\tau_{a,n}$ (323), obtained from the feedback loop, is actually equal to $S_n - \gamma_t$. With a true time offset denoted as $\beta_{T0}$ and a received signal denoted as y(n), the received signal after applying the STR adjustment may be as in Equation (1) as follows:

$$y(n-\beta_{T0}+[\tau_{a,n}])=y(n-\beta_{T0}+[S_n]-\gamma_t) \quad (1)$$

If there is an estimation error $\delta>0$ such that $[S_n]=\beta_{T0}+\delta$, then the received signal in Equation (1) above may be as in Equation (2) as follows:

$$y(n-\beta_{T0}+[\tau_{a,n}])=y(n+\delta-\gamma_t) \quad (2)$$

If there is no nonzero FAP offset such that $\gamma_t=0$, the received signal becomes $\gamma(n+\delta)$. Thus, the FFT window may be placed behind the correct timing due to estimation error, which may cause inter-symbol interference (ISI). However, if there is a proper nonzero FAP offset such that $\gamma_t > \delta$, then n+δ−γ_t<n. Thus, the FFT window is placed before the correct timing. Due to a cyclic prefix (CP) in an OFDM system, there will be no ISI in such a situation.

The gain stage 205 includes an input connected to the output of the subtractor 203 and an amplifier output 219, where the gain stage 205 has loop gain α. The gain stage 205 applies the loop gain α to the intermediate STR adjustment to obtain an amplified intermediate STR adjustment. The adder 207 includes a first input connected to the output 219 of the gain stage 205 for receiving the amplified intermediate STR adjustment, a second input 221 for receiving a delayed accumulated STR adjustment, and an output 223, where the output 223 of the adder 207 provides an accumulated STR adjustment $\tau_a$. That is, $\tau_a$ results from subtracting $\gamma_t$ from estimated FAP z', multiplying the difference by a, and adding the delayed accumulated STR adjustment to the product.

The delay stage 209 includes an input connected to the output 223 of the adder 207 for receiving the accumulated STR adjustment and an output connected to the second input 221 of the adder 207 for providing the delayed accumulated STR adjustment. The rounding processor 211 includes an input connected to the output 223 of the adder 207 for receiving the accumulated STR adjustment and an output connected to the output 111 of the STR processor 103 for providing a rounded STR adjustment. The rounding processor 211 applies a rounding operation to the accumulated STR adjustment to obtain a rounded accumulated STR adjustment. Since an FFT window shift must be an integer number of samples, a rounding operation is applied by the rounding processor 211 on the accumulated STR adjustment. The FFT timing window is adjusted according to the rounded accumulated STR adjustment.

Figure 3:
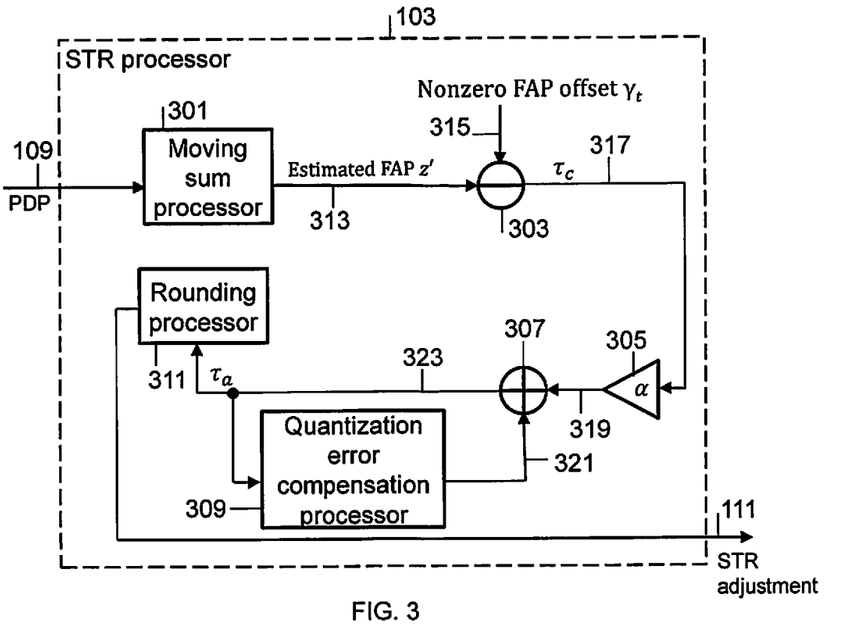
FIG. 3 is a block diagram of an STR processor of FIG. 1, according to an embodiment.

FIG. 3 is a block diagram of the STR processor 103 of FIG. 1, according to an embodiment.

Referring to FIG. 3, the STR processor 103 includes a moving sum processor 301, a subtractor 303, a gain stage 305 (e.g., an amplifier), an adder 307, a quantization error compensation processor 309, and a rounding processor 311. In an embodiment, the moving sum processor 301, the quantization error compensation processor 309, and the rounding processor 311 may be included in one processor, or the functionality of each may be distributed amongst a plurality of processors.

The moving sum processor 301 includes an input connected to the output 109 of the CE processor 101 for receiving the PDP, and an output 313 for providing an estimate of an FAP z'. The subtractor 303 includes a first input connected to the output 313 of the moving sum processor 301 for receiving the instantaneous estimated FAP z' without any STR adjustment, a second input 315 for receiving a nonzero FAP offset $\gamma_t$ to be subtracted from the estimated of an FAP z', and an output 317 to provide the difference as an intermediate STR adjustment $\tau_c$.

The gain stage 305 includes an input connected to the output 317 of the subtractor 303 and an amplifier output 319 for providing an amplified intermediate STR adjustment, where the gain stage 305 has loop gain α. The adder 307 includes a first input connected to the amplifier output 319 of the gain stage 305, a second input 321 for receiving a quantization error compensated accumulated STR adjustment, and an output 323, where the output 323 of the adder 307 provides the accumulated STR adjustment $\tau_a$.

The quantization error compensation processor 309 includes an input connected to the output 323 of the adder 307 and an output connected to the second input 321 of the adder 307. The quantization error compensation processor 309 adds quantization error compensation to the amplified intermediate STR adjustment to obtain an accumulated STR adjustment. The rounding processor 311 includes an input connected to the output 323 of the adder 307 and an output connected to the output 111 of the STR processor 103. The rounding processor 311 applies a rounding operation to the accumulated STR adjustment to obtain a rounded accumulated STR adjustment. In order to compensate for a quantization error from the rounding operation, an embodiment of the present disclosure includes the STR processor 103 having the quantization error compensation processor 309. The STR processor 103 reduces the variance of the estimated FAP z' and makes the estimated FAP z' more stable around the true FAP z. The FFT timing window is adjusted according to the rounded accumulated STR adjustment.

Since an FFT window shift must be an integer number of samples, a rounding operation is applied by the rounding processor 311 on the accumulated STR adjustment $\tau_a$, which may cause a quantization error. One embodiment of the present disclosure includes the quantization error compensation processor 309 that is integrated into the STR processor 103 to compensate for an error from the rounding operation.

Figure 4:
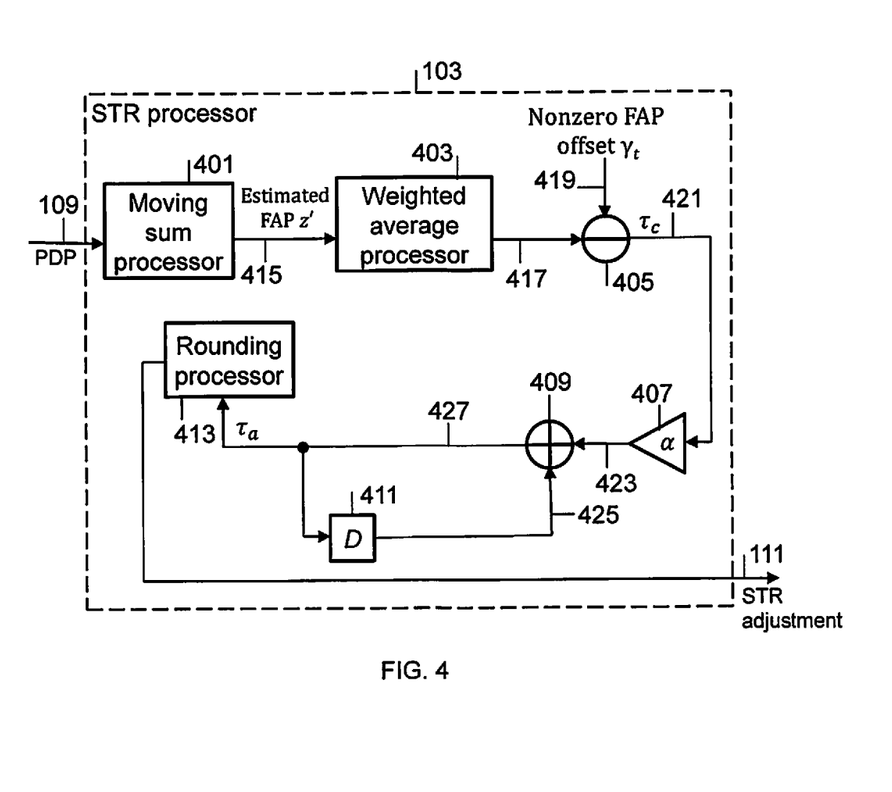
FIG. 4 is a block diagram of an STR processor of FIG. 1, according to an embodiment.

FIG. 4 is a block diagram of the STR processor 103 of FIG. 1, according to an embodiment.

Referring to FIG. 4, the STR processor 103 includes a moving sum processor 401, a weighted average processor 403, a subtractor 405, a gain stage 407 (e.g., an amplifier), an adder 409, a delay stage 411, and a rounding processor 413. In an embodiment, the moving average processor 401, the weighted average processor 403, and the rounding processor 413 may be included in one processor, or the functionality of each may be distributed amongst a plurality of processors.

The moving sum processor 401 includes an input connected to the output 109 of the CE processor 101 for receiving the PDP, and an output 415 for providing the estimate of the FAP z'. The weighted average processor 403 includes an input connected to the output 415 of the moving sum processor 401 for receiving the estimated FAP z' and an output 417 for providing a weighted average of the estimated FAP z'. The subtractor 405 includes a first input connected to the output 417 of the weighted average processor 403, a second input 419 for receiving the nonzero FAP offset $\gamma_t$ (e.g., the target FAP offset), and an output 421, where the output 421 of the subtractor 405 provides an intermediate STR adjustment $\tau_c$ (i.e., the modified FAP). The weighted average processor 403 may use an instantaneous PDP with a mask to refine the output 417. A mask operation is applied on the change of the estimated FAP before and after the weighted average processor 403 to refine the output 417 of the weighted average and constrain the correction from weighted average within a reasonable range. The amount of change may be scaled by an output of a raised cosine filter applied on a power ratio of instantaneously estimated PDP.

When the resolution of the PDP is low (i.e., the sampling rate of the PDP is much less than the sampling rate of the OFDM system), the weighted average processor 403 is activated. The weighted average processor 403 may receive the estimated FAP z' and the PDP as input, and output a refined FAP. With the input FAP denoted as r and the PDP denoted as P(t), the refined FAP from weighted average is as in Equation (3) as follows:

$$\tau' = \frac{\sum_{t=\tau-w_l}^{\tau+w_r} t \cdot P(t)}{\sum_{t=\tau-w_l}^{\tau+w_r} P(t)} \quad (3)$$

where $w_l$ and $w_r$ denote the left and right window size, respectively, where weighted average is performed within.

The effect of the weighted average processor 403 is to obtain an averaged FAP estimation based on the PDP around it. However, since the weighted average is calculated from the instantaneous PDP, the quality of the PDP estimation affects the results. Ideally, the power of the channel tap at FAP should be greater than the power of channel taps round the channel tap at FAP. However, for an instantaneously calculated PDP, it is possible that the power of channel taps around FAP is greater than the power of the channel tap at FAP, which may cause the refined FAP τ' to be incorrectly shifted by a large amount. In order to constrain the amount of the shift, a masking operation based on the power ratio may be applied. After τ' is calculated, the amount of shift may be as in Equation (4) as follows:

$$\Delta_\tau = \tau' - \tau \quad (4)$$

and depending on whether $\Delta_\tau$ is greater than or less than 0, the power ratio may be as in Equation (5) as follows:

$$r = \begin{cases} \dfrac{\sum_{t=\tau-w_l}^{\tau+w_r} P(t)}{P(\tau)}, & \Delta_\tau \geq 0 \\[2ex] \dfrac{\sum_{t=\tau-w_l}^{\tau+w_r} P(t)}{P(\tau)}, & \Delta_\tau < 0 \end{cases} \quad (5)$$

If the power ratio r is too large, τ' may have been greatly shifted as compared to τ, so τ' may not be reliable. In order to constrain the shift, a mask H(r) may be applied on r, which may be a raised cosine filter as in Equation (6) as follows:

$$H(r) = \begin{cases} 1, & |r| \leq \dfrac{1-\beta}{2T} \\[1ex] \dfrac{1}{2}\left[1 + \cos\left(\dfrac{\pi T}{\beta}\left[|r| - \dfrac{1-\beta}{2T}\right]\right)\right], & \dfrac{1-\beta}{2T} < |r| \leq \dfrac{1+\beta}{2T} \\[1ex] 0, & \text{otherwise} \end{cases} \quad (6)$$

For example, a raised cosine filter may have T=½,β=1.

Figure 5:
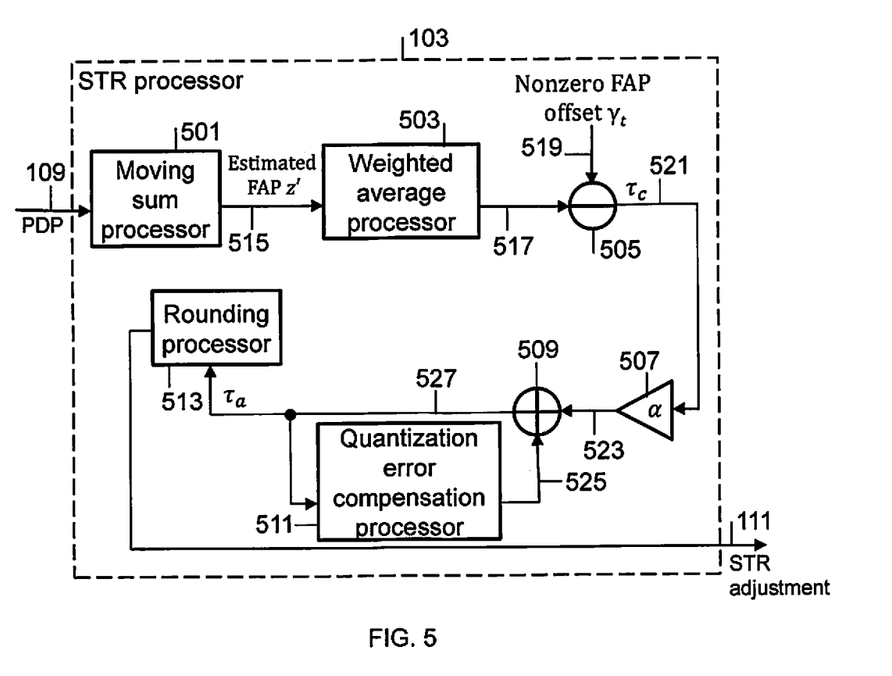
FIG. 5 is a block diagram of an STR processor of FIG. 1, according to an embodiment.

An amount of the shift $\Delta_\tau$ may be scaled by H(r) and added back to obtain a refined FAP as in Equation (7) as follows:

$$\tau' = \tau + \Delta_\tau \cdot H(r) \quad (7)$$

which is the final output of the weighted average processor 503.

The gain stage 407 includes an input connected to the output 421 of the subtractor 405 to receive the intermediate STR adjustment $\tau_c$ and an amplifier output 423 for providing an amplified intermediate STR adjustment, where the gain stage 407 has loop gain α. The adder 409 includes a first input connected to the output 423 of the gain stage 407, a second input 425 for receiving a delayed accumulated STR adjustment, and an output 427, where the output 427 of the adder 409 provides the accumulated STR adjustment $\tau_a$.

The delay stage 411 includes an input connected to the output 427 of the adder 409 and an output connected to the second input 425 of the adder 409. The rounding processor 413 includes an input connected to the output 427 of the adder 409 and an output connected to the output 111 of the STRP processor 103 for providing the adjusted STR.

FIG. 5 is a block diagram of the STR processor 103 of FIG. 1, according to an embodiment.

Referring to FIG. 5, the STR processor 103 includes a moving sum processor 501, a weighted average processor 503, a subtractor 505, a gain stage 507 (e.g., an amplifier), an adder 509, a quantization error compensation processor 511, and a rounding processor 513. In an embodiment, the moving average processor 501, the weighted average processor 503, the quantization error compensation processor 511, and the rounding processor 513 may be included in one processor, or the functionality of each may be distributed amongst a plurality of processors.

The moving sum processor 501 includes an input connected to the output 109 of the CE processor 101 for receiving the PDP, and an output 515 for providing the estimate of the FAP z'. The weighted average processor 503 includes an input connected to the output 515 of the moving sum processor 501 for receiving the estimated FAP z' and an output 517 for providing a weighted average of the estimated FAP z'. The subtractor 505 includes a first input connected to the output 517 of the weighted average processor 503, a second input 519 for receiving the nonzero FAP offset $\gamma_t$ (e.g., the target FAP offset), and an output 521, where the output 521 of the subtractor 505 provides an intermediate STR adjustment $\tau_c$ (i.e., the modified FAP). The weighted average processor 503 may use an instantaneous PDP with a mask to refine the output 517. A mask operation is applied on the change of the estimated FAP before and after the weighted average processor 503 to refine the output 517 of the weighted average and constrain the correction from weighted average within a reasonable range. The amount of change may be scaled by an output of a raised cosine filter applied on a power ratio of the instantaneously estimated PDP.

The gain stage 507 includes an input connected to the output 521 of the subtractor 505 to receive the intermediate STR adjustment $\tau_c$ and an amplifier output 523 for providing an amplified intermediate STR adjustment, where the gain stage 507 has loop gain α. The adder 509 includes a first input connected to the output 523 of the gain stage 507, a second input 525 for receiving a quantization error compensated accumulated STR adjustment, and an output 527, where the output 527 of the adder 509 provides the accumulated STR adjustment $\tau_a$.

Since an FFT window shift must be an integer number of samples, a rounding operation is applied by the rounding processor 513 on the accumulated STR adjustment $\tau_a$, which may cause a quantization error. One embodiment of the present disclosure includes the quantization error compensation processor 511 that is integrated into the STR processor 103 to compensate for an error from the rounding operation. One embodiment of the present disclosure further includes the weighted average processor 503 for determining an adaptive weighted average with a mask to control a level of refinement when the resolution of the PDP is low. Since the adaptive weighted average utilizes the instantaneous estimated PDP, the adaptive weighted average may be sensitive to the estimation quality of the PDP. One embodiment of the present disclosure further applies a mask operation on the output of the weighted average processor 503, which provides a much more robust refinement. The weighted average leads to better STR adjustment when the resolution of PDP is low and the number of resource blocks (RBs) is small.

Figure 6:
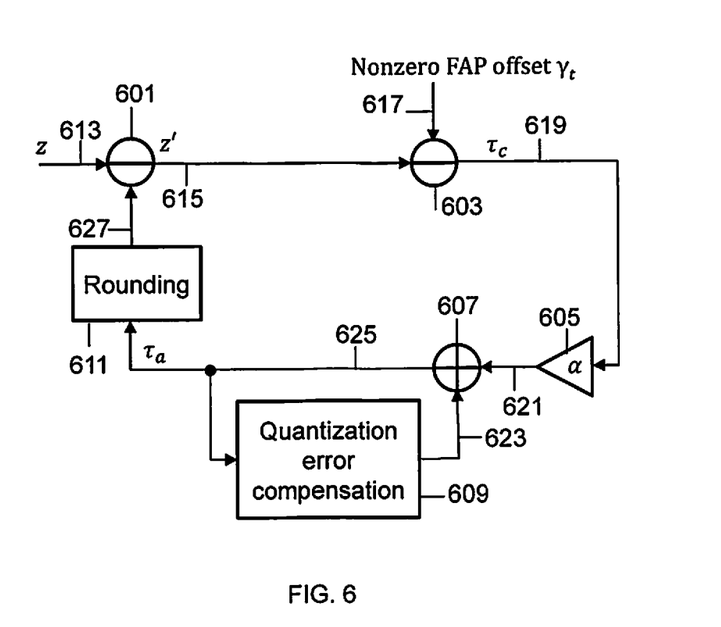
FIG. 6 is an illustration of a mathematical principle of a feedback loop, according to an embodiment.

FIG. 6 is an illustration of a mathematical principle of a feedback loop, according to an embodiment.

Referring to FIG. 6, the mathematical principle includes a first subtractor 601, a second subtractor 603, a gain stage 605 (e.g., an amplifier), an adder 607, quantization error compensation 609, and a rounding 611.

The first subtractor 601 includes a first input 613 for receiving an estimated FAP z assuming no STR adjustment is applied, a second input 627 for rounded $\tau_a$, and an output 615 for providing an estimated FAP z' assuming the STR adjustment of rounded $\tau_a$ is applied. The second subtractor 603 includes a first input connected to the output 615 of the first subtractor 601 for receiving the instantaneous estimated FAP z', a second input 617 for receiving a nonzero FAP offset $\gamma_t$ to be subtracted from the estimated FAP z', and an output 619 to provide the difference as an intermediate STR adjustment $\tau_c$.

The gain stage 605 includes an input connected to the output 619 of the second subtractor 603 and an amplifier output 621 for providing an amplified intermediate STR adjustment, where the gain stage 605 has loop gain $\alpha$. The adder 607 includes a first input connected to the amplifier output 621 of the gain stage 605, a second input 623 for receiving a quantization error compensated accumulated STR adjustment, and an output 625, where the output 625 of the adder 607 provides the accumulated STR adjustment $\tau_a$.

The quantization error compensation 609 includes an input connected to the output 625 of the adder 607 and an output connected to the second input 623 of the adder 607. The quantization error compensation 609 adds quantization error compensation to the amplified intermediate STR adjustment to obtain an accumulated STR adjustment. The rounding 611 includes an input connected to the output 625 of the adder 607 and an output 627 connected to the second input of the first subtractor 613. The rounding 611 applies a rounding operation to the accumulated STR adjustment to obtain a rounded accumulated STR adjustment. In order to reduce a variance of the estimated FAP z', as well as to compensate for a quantization error of the FAP z', an embodiment of the present disclosure includes the quantization error compensation 609. The mathematical principle reduces the variance of the estimated FAP z' and makes the estimated FAP z' more stable around the true FAP An error caused from the rounding may be compensated for by the quantization error compensation as expressed in Equation (8), which corresponds to FIG. 6, as follows:

$$\tau_{a,n} = S_n - \gamma_t = \tau_{a,n-1} + \alpha \cdot \tau_{c,n} + \alpha \cdot ([\tau_{a,n-1}] - \tau_{a,n-1}) \quad (8)$$

where subscript n denotes the time instance, [•] denotes the rounding operation, and $S_n$ is the IIR filter on the estimated FAP $z_n$ assuming no STR adjustment is applied, which may be as in Equation (9) as follows:

$$S_n = IIR_\alpha(z_n) = \alpha \cdot z_n + (1-\alpha) \cdot S_{n-1} \quad (9)$$

Equation (8) above indicates that the accumulated STR adjustment $\tau_{a,n}$, which may be obtained as $\tau_{a,n-1} + \alpha \cdot \tau_{c,n} + \alpha \cdot ([\tau_{a,n-1}] - \tau_{a,n-1})$ is in fact equivalent to the IIR filtered version of the estimated FAP $z_n$ subtracted by nonzero FAP offset $\gamma_t$. Since $\gamma_t$ is a constant, the variance of $\tau_{a,n}$ is equivalent to the variance of $S_n$. Thus, the variance of $\tau_{a,n}$ may be as in Equation (10) as follows:

$$\sigma_\tau^2 = \sigma_S^2 = \frac{\alpha}{2-\alpha} \sigma_z^2 \quad (10)$$

where $\sigma_\tau^2$, $\sigma_S^2$, $\sigma_z^2$ denote the variances of $\tau_{a,n}$, $S_n$, $z_n$, respectively. By choosing the loop gain $\alpha < 1$, the variance of the accumulated STR adjustment, $\sigma_\tau^2$, is reduced as compared to the variance of the estimated FAP without STR adjustment, $\sigma_z^2$.

Figure 7:
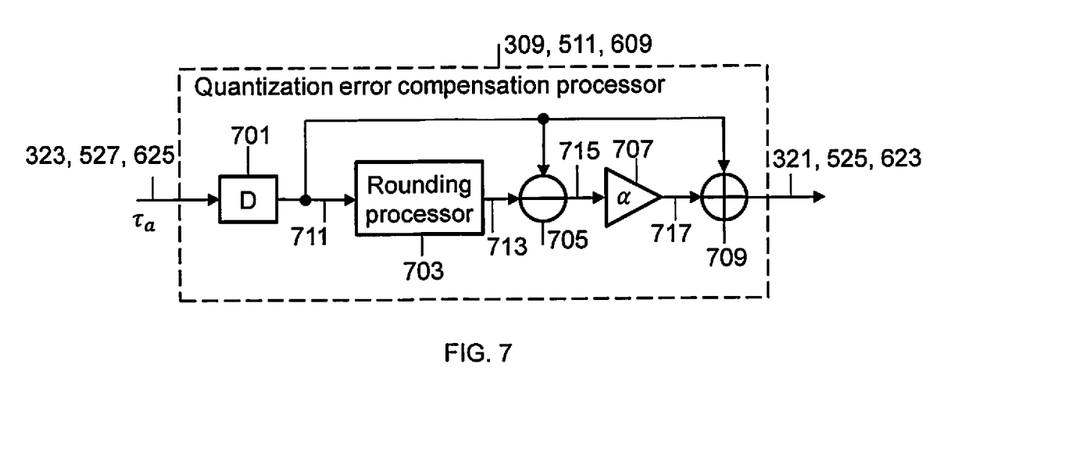
FIG. 7 is a block diagram of a quantization error compensation processor of processor of FIGS. 3, 5, and 6, according to an embodiment.

FIG. 7 is a block diagram of the quantization error compensation processor 309, 511, and 609 of FIGS. 3, 5, and 6, respectively, according to an embodiment.

Referring to FIG. 7, the quantization error compensation processor 309, 511, and 609 includes a delay stage 701, a rounding processor 703, a subtractor 705, a gain stage 707 (e.g., an amplifier), and an adder 709. In an embodiment, the functionality of the rounding processor 703 may be distributed amongst a plurality of processors.

The delay stage 701 includes an input connected to the output 323, 527, and 625 of the adder 307, 509, and 607 of the STR processor 103 for receiving the accumulated STR adjustment $\tau_a$, respectively, and an output 711. The rounding processor 703 includes an input connected to the output 711 of the delay stage 701 and an output 713.

The subtractor 705 includes a first input connected to the output 713 of the rounding processor 703, a second input connected to the output 711 of the delay stage 701 for receiving a value to be subtracted from the first input connected to the output 713 of the rounding processor 703, and an output 715. The gain stage 707 includes an input connected to the output 715 of the subtractor 705 and an output 717, where the gain stage 707 has loop gain $\alpha$. The adder 709 includes a first input connected to the output 717 of the gain stage 707, a second input connected to the output 711 of the delay stage 701, and an output connected to the output 321,525, and 623 of the quantization error compensation processor 309,511, and 609, respectively.

Figure 8:
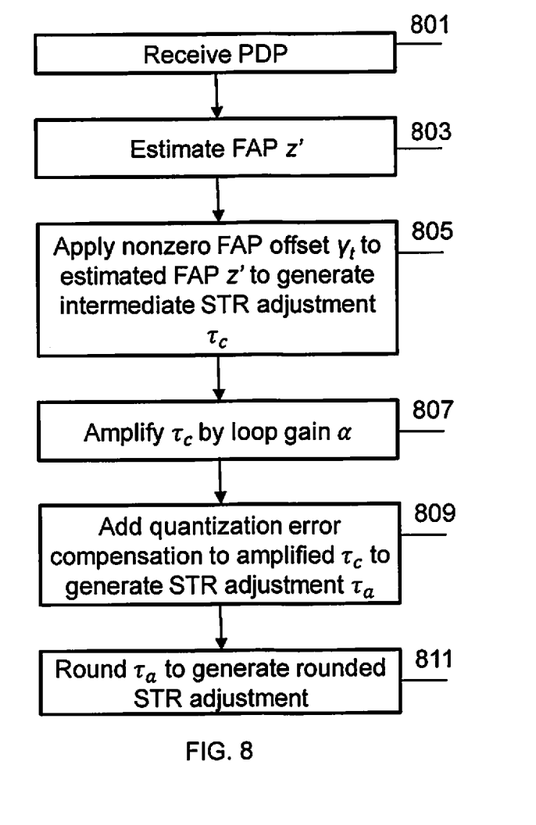
FIG. 8 is a flowchart of a method of generating a rounded STR adjustment, according to an embodiment.

FIG. 8 is a flowchart of a method of generating a rounded STR adjustment, according to an embodiment. A step performed by a processor may be distributed amongst a plurality of processors.

Referring to FIG. 8, the method receives a PDP at 801.

At 803, an instantaneous FAP z' is estimated. The instantaneous FAP z' may be estimated by performing a moving sum across a channel PDP using a window of length W. The PDP may be determined by channel estimation using an RS.

At 805, a nonzero FAP offset $\gamma_t$ is applied to the estimated instantaneously estimated FAP z' to generate an intermediate STR adjustment $\tau_c$.

At 807, the intermediate STR adjustment $\tau_c$ is amplified by a loop gain $\alpha$.

At 809, quantization error compensation is added to the amplified intermediate STR adjustment $\tau_c$ to generate an STR adjustment $\tau_a$.

At 811, the STR adjustment $\tau_a$ is rounded, which is the output of the STR processor 103.

Figure 9:
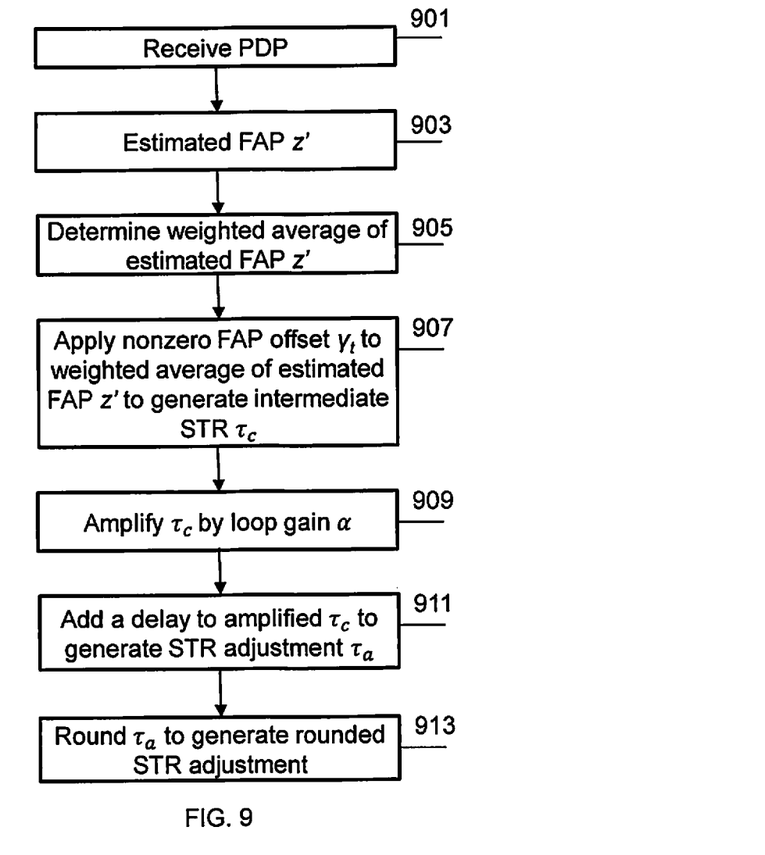
FIG. 9 is a flowchart of a method of generating a rounded STR adjustment, according to an embodiment.

FIG. 9 is a flowchart of a method of generating a rounded STR adjustment, according to an embodiment. A step performed by a processor may be distributed amongst a plurality of processors.

Referring to FIG. 10, the method receives a PDP at 901.

At 903, an instantaneous FAP z is estimated. The instantaneous FAP z' may be estimated by performing a moving sum across a channel PDP using a window of length W. The PDP may be determined by channel estimation using an RS.

At 905, a weighted average of the estimated instantaneous FAP z' is determined. The weighted average may obtain an averaged FAP estimation based on the PDP around it. The weighted average may further include a masking operation based on a power ratio to constrain an amount of shift of the weighted averaged FAP. In an embodiment, the weighted average may be omitted.

At 907, a nonzero FAP offset $\gamma_t$ is applied to the weighted average of the estimated instantaneously estimated FAP z' to generate an intermediate STR adjustment $\tau_c$.

At 909, the intermediate STR adjustment $\tau_c$ is amplified by a loop gain $\alpha$.

At 911, a delayed STR adjustment $\tau_a$ (i.e., STR adjustment in the previous time slot) is added to the amplified intermediate STR adjustment $\tau_c$ to generate an STR adjustment $\tau_a$.

At 913, the STR adjustment $\tau_a$ is rounded, which is the output of the STR processor 103.

Figure 10:
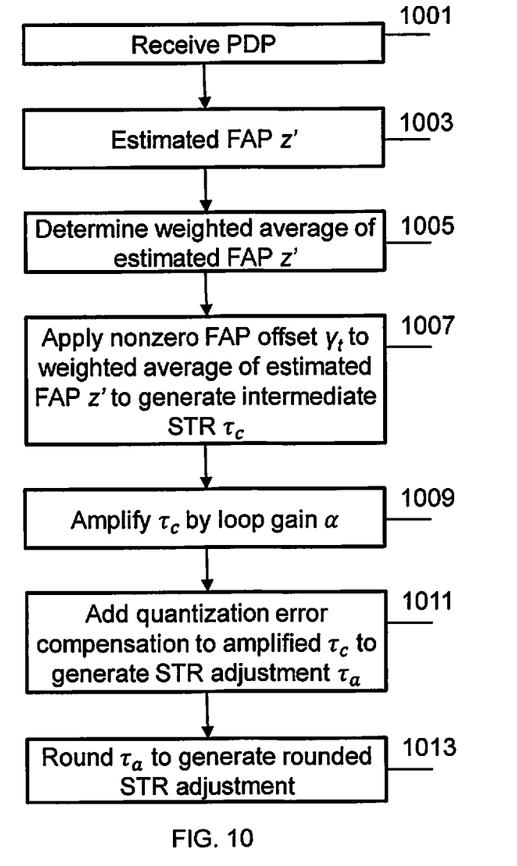
FIG. 10 is a flowchart of a method of generating a rounded STR adjustment, according to an embodiment.

FIG. 10 is a flowchart of a method of generating a rounded STR adjustment, according to an embodiment. A step performed by a processor may be distributed amongst a plurality of processors.

Referring to FIG. 10, the method receives a PDP at 1001.

At 1003, an instantaneous FAP z' is estimated. The instantaneous FAP z' may be estimated by performing a moving sum across a channel PDP using a window of length W. The PDP may be determined by channel estimation using an RS.

At 1005, a weighted average of the estimated instantaneous FAP z' is determined. The weighted average may obtain an averaged FAP estimation based on the PDP around it. The weighted average may further include a masking operation based on a power ratio to constrain an amount of shift of the weighted averaged FAP. In an embodiment, the weighted average may be omitted.

At 1007, a nonzero FAP offset $\gamma_t$ is applied to the weighted average of the estimated instantaneously estimated FAP z' to generate an intermediate STR adjustment $\tau_c$.

At 1009, the intermediate STR adjustment $\tau_c$ is amplified by a loop gain $\alpha$.

At 1011, quantization error compensation is added to the amplified intermediate STR adjustment $\tau_c$ to generate an STR adjustment $\tau_a$.

At 1013, the STR adjustment $\tau_a$ is rounded, which is the output of the STR processor 103.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According various embodiments, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C;" "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "processor" may include a unit implemented in hardware, software, or firmware, and may interchangeably be used with other terms, for example, "logic," "logic block," "part," or "circuitry". A processor may be a single integral component, or a minimum unit or part thereof, adapted to perform one or more functions. For example, a processor may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
   receiving an estimated first arrival path (FAP);
   processing the estimated FAP by subtracting a nonzero FAP offset from the estimated FAP to generate an intermediate adjustment value;
   providing a rounding operation on the processed estimated FAP to generate an adjustment value for adjusting a fast Fourier transform (FFT) window;
   determining a quantization error based on the processed estimated FAP; and
   summing the quantization error to the processed estimated FAP.

2. The method of claim 1, wherein the estimated FAP is determined by performing a moving sum operation.

3. The method of claim 2, wherein the moving sum operation comprises a moving sum operation on a channel power delay profile (PDP).

4. The method of claim 3, wherein the moving sum operation comprises sliding a window of length W across the PDP and cumulatively summing values of the sliding windows, wherein W is an integer.

5. The method of claim 3, further comprising obtaining the PDP by estimating a channel.

6. The method of claim 1, wherein processing the estimated FAP further comprises amplifying the intermediate adjustment value.

7. An apparatus, comprising:
   a moving sum processor configured to estimate a first arrival path (FAP);
   a processor configured to process the estimated FAP;
   a subtractor configured to subtract a nonzero FAP offset from the estimated FAP to generate an intermediate adjustment value;
   a rounding processor configured to perform a rounding operation on the processed estimated FAP to generate an adjustment value for adjusting a fast Fourier transform (FFT) window;
   a quantization error compensation processor configured to determine a quantization error based on the processed estimated FAP; and
   an adder configured to sum the quantization error to the processed estimated FAP.

8. The apparatus of claim 7, wherein the moving sum processor is further configured to estimate the FAP by performing a moving sum operation.

9. The apparatus of claim 8, wherein the moving sum processor is further configured to perform a moving sum operation on a channel power delay profile (PDP).

10. The apparatus of claim 9, wherein the moving sum processor is further configured to slide a window of length W across the PDP and cumulatively sum values in the sliding window, wherein W is an integer.

11. The apparatus of claim 9, further comprising a channel estimation processor configured to obtain the PDP by estimating a channel.

12. The apparatus of claim 7, further comprising:
   an amplifier configured to amplify the intermediate adjustment value.

* * * * *